(12) United States Patent
Reichert et al.

(10) Patent No.: US 7,205,685 B2
(45) Date of Patent: Apr. 17, 2007

(54) SOLENOID PLUNGER SYSTEM WITH AN ADJUSTABLE MAGNETIC FLUX

(75) Inventors: Uwe Reichert, Schlüchtern (DE); Josef Praiza, Vsetin (CS)

(73) Assignee: WOCO Industrietechnik GmbH, Bad Soden-Salmunster (DE)

( * ) Notice: Subject to any disclaimer, the term of this patent is extended or adjusted under 35 U.S.C. 154(b) by 0 days.

(21) Appl. No.: 10/535,040

(22) PCT Filed: Nov. 12, 2003

(86) PCT No.: PCT/DE03/03760

§ 371 (c)(1),
(2), (4) Date: Dec. 20, 2005

(87) PCT Pub. No.: WO2004/044932

PCT Pub. Date: May 27, 2004

(65) Prior Publication Data

US 2006/0145545 A1    Jul. 6, 2006

(30) Foreign Application Priority Data

Nov. 14, 2002  (DE)  ............................. 102 53 347
Jun. 18, 2003  (DE)  ............................. 103 27 875

(51) Int. Cl.
*H01F 7/08*   (2006.01)
*H01F 3/12*   (2006.01)
*F16K 31/06*  (2006.01)

(52) U.S. Cl. ........................ 310/14; 335/298; 310/17
(58) Field of Classification Search ............. 335/298

See application file for complete search history.

(56) References Cited

U.S. PATENT DOCUMENTS 4,403,765 A * 9/1983 Fisher ....................... 251/65

(Continued)

FOREIGN PATENT DOCUMENTS

DE    41 10 003 C1    7/1992

(Continued)

*Primary Examiner*—Burton Mullins
(74) *Attorney, Agent, or Firm*—Christensen O'Connor Johnson Kindness PLLC

(57) ABSTRACT

A solenoid plunger system for an electropneumatic pressure transducer, comprising at least partly—in a casing which focuses magnetic field lines M, in particular in the form of an iron casing—a solenoid plunger and a core, in particular in the form of an iron core or magnetic core, wherein the solenoid plunger comprises at least one recess on the side facing towards the core, and/or the core comprises at least one recess on the side facing towards the solenoid plunger, and an air gap is provided between the solenoid plunger and the core; the air gap is adjustable by relative movement between the solenoid plunger and the core, during which relative movement the solenoid plunger can, at least partly, be moved into/out of the first recess in the core, and/or the core can be moved, at least partly, into/out of the recess in the solenoid plunger; the casing comprises at least a first shell and a yoke, each of high magnetic permeability, wherein the first shell is arranged between the solenoid plunger and at least one coil and/or at least one magnet, and the air gap is arranged in a region between the first shell and the yoke; and the casing comprises a second shell of high magnetic permeability between the first shell and the yoke, wherein said second shell comprises at least one recess, in particular in the shape of an annular groove, on its side facing away from the core, for focusing magnetic field lines M from the yoke onto the core, and in that in the region of the recess of said second shell, the yoke and/or an adjustment member, in particular in the form of an adjustment ring, of high magnetic permeability is/are moveable relative to said second shell, for adjusting the magnetically effective length l of the recess of the second shell.

21 Claims, 3 Drawing Sheets

U.S. PATENT DOCUMENTS

Figure 1:
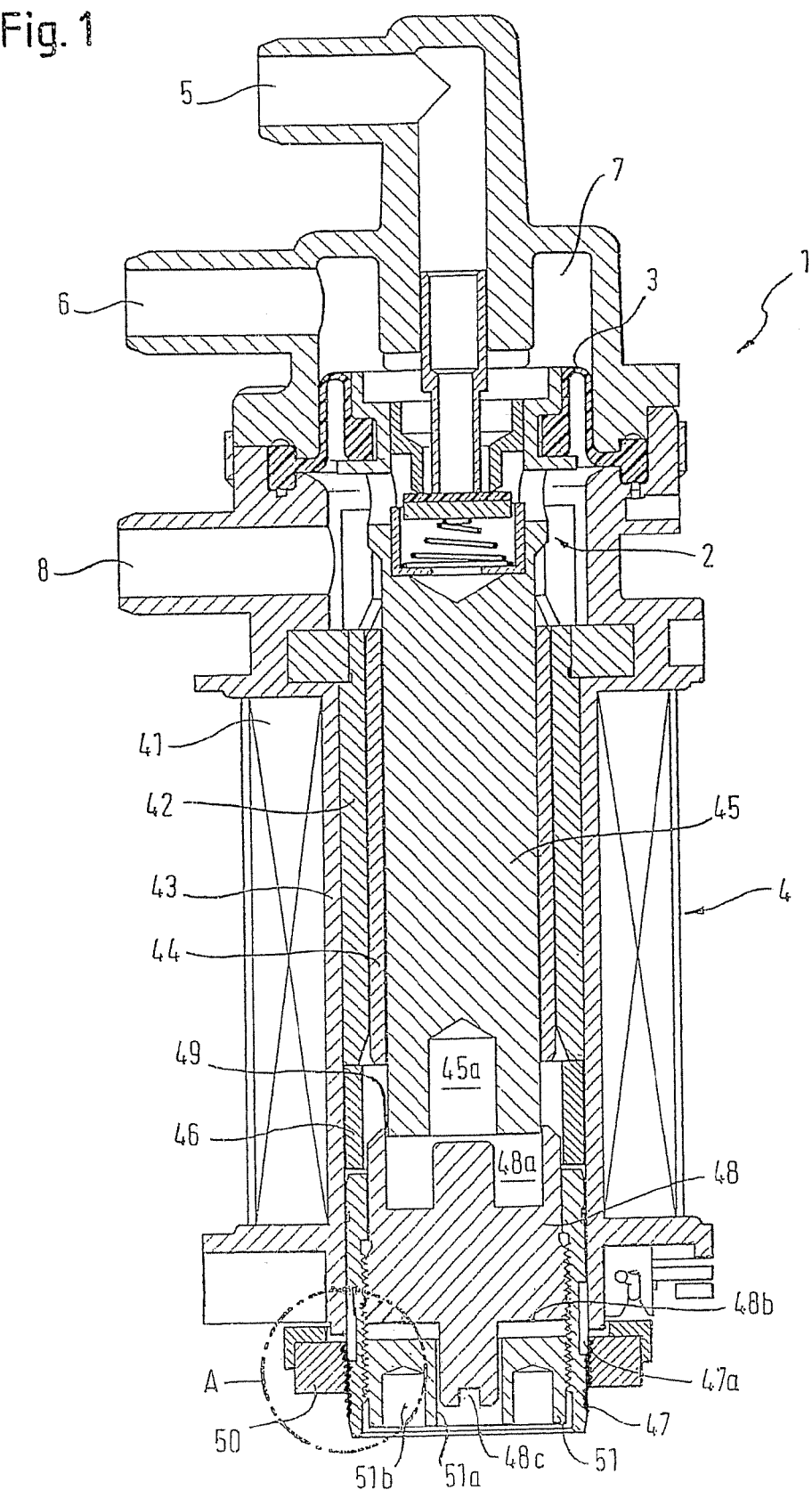

| | | | |
|---|---|---|---|
| 4,651,118 A | * | 3/1987 | Zeuner et al. .............. 335/258 |
| 4,954,799 A | * | 9/1990 | Kumar ....................... 335/236 |
| 5,890,662 A | * | 4/1999 | Dykstra ................... 239/585.1 |
| 2002/0121828 A1 | | 9/2002 | Ketschau et al. |

FOREIGN PATENT DOCUMENTS

| | | | |
|---|---|---|---|
| DE | 4334031 A1 | * | 4/1995 |
| EP | 928010 A2 | * | 7/1999 |

* cited by examiner

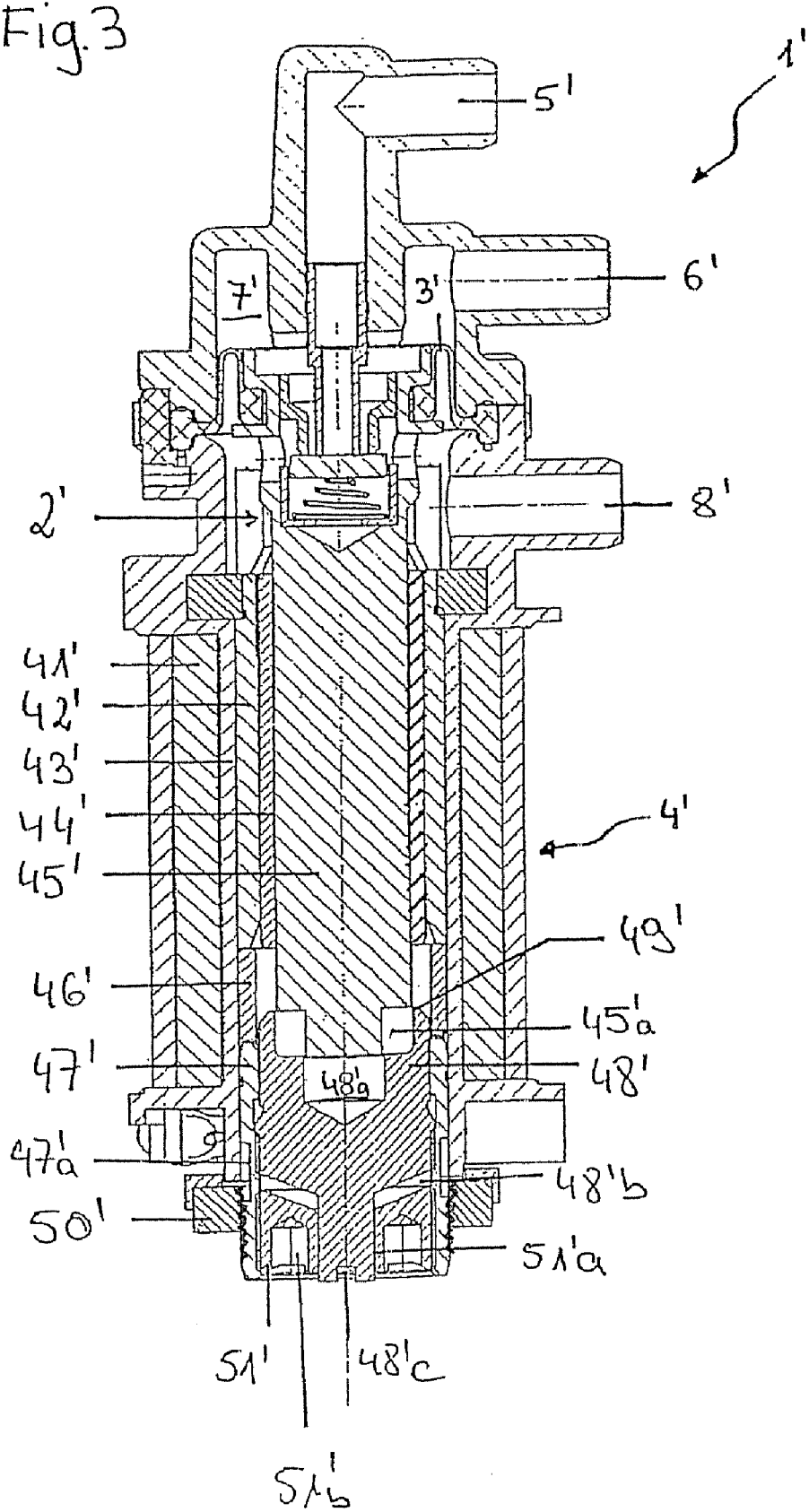

SOLENOID PLUNGER SYSTEM WITH AN ADJUSTABLE MAGNETIC FLUX

The invention relates to a solenoid plunger system for an electropneumatic pressure transducer, comprising at least partly—in a casing which focuses magnetic field lines M, in particular in the form of an iron casing—a solenoid plunger and a core, in particular in the form of an iron core or magnetic core, wherein the solenoid plunger comprises at least one recess on the side facing towards the core, and/or the core comprises at least one first recess on the side facing towards the solenoid plunger, and an air gap is provided between the solenoid plunger and the core, wherein the air gap is adjustable by relative movement between the solenoid plunger and the core, during which relative movement the solenoid plunger can, at least partly, be moved into/out of the first recess in the core, and/or the core can be moved, at least partly, into/out of the recess in the solenoid plunger, and the casing comprises at least a first shell or sleeve and a yoke, each of high magnetic permeability, wherein the first shell is arranged between the solenoid plunger and at least one coil and/or at least one magnet, and the air gap is arranged in a region between the first shell and the yoke.

An electropneumatic pressure transducer with a generic solenoid plunger system is for example known from DE 41 10 003 C1. In this arrangement, in a chamber (mixing chamber) of the known electropneumatic pressure transducer, from negative pressure at a first connection and atmospheric pressure at a second connection, mixing pressure is generated which at a third connection is made available to a consumer. The inflow of negative pressure or atmospheric pressure into the above-mentioned chamber is regulated by a double seat valve. In this arrangement, the connection of the chamber with the negative pressure side depends on the arrangement of a valve shim whose movement is supported by a pretensioned compression spring, but can also be initiated simply by activating an electromagnet of the solenoid plunger system. A connection between the chamber and the atmospheric pressure depends on the position of a solenoid plunger of the solenoid plunger system. Thus the movement of the valve shim is initiated by pneumatic forces in that the differential pressure between the pressure in the chamber and the atmospheric pressure exerts a particular force on the solenoid plunger across a defined area. In this arrangement, in normal operation of the electropneumatic transducer, there is a state of equilibrium for all mixing pressures, which state of equilibrium manifests itself in that the sum of all forces acting on the solenoid plunger of the solenoid plunger system is zero. These forces are: the spring force of the compression spring, the tensile force of the electromagnet, and the pneumatic forces. This is thus a regulated system with a proportional/integral behaviour. In this arrangement, the proportional behaviour arises from the compression spring and the electromagnet, while the pneumatic system contributes the integrating behaviour by means of the pressure that builds up in said chamber. A direct clocked or synchronized current with variable clock ratios, which direct current is applied to the electromagnet, supplies the desired value of the regulating circuit. Depending on the cycle ratio, in a coil of the electromagnet there is another effective current which results in another effective magnetic force. For each magnetic force in turn, the electropneumatic pressure transducer adjusts to a new mixing pressure and thus to a new state of equilibrium. This regulating system can only be achieved in that a characteristic-curve magnet is used in the solenoid plunger system. According to DE 41 10 003 C1, this characteristic-curve magnet comprises two iron cores. In this arrangement, the first iron core is slidable relative to an iron casing which focuses magnetic lines of force, and is thus also slidable relative to a solenoid plunger, while the second iron core is slidable relative to the first iron core, wherein the second iron core can protrude into a recess of the solenoid plunger. Thus the air gap between the solenoid plunger and the variable-contour characteristic-curve magnet comprising the two iron cores, which air gap is essential for generating the force in the solenoid plunger system, can be adjusted in a dual manner. This dual adjustability of one and the same magnetic parameter, namely the air gap between the solenoid plunger and the characteristic-curve magnet and thus the field distribution, always takes place in a mutually interactive way, wherein, as a result of the area ratio, the adjustment of the first iron core has a greater influence than does adjustment of the second iron core. Disadvantageously, the two adjustments can thus not take place in a decoupled manner, and consequently precise adjustment of the air gap, and thus in particular any compensation for dimensional tolerances, is made difficult. Certainly, it is possible, by means of the first iron core, to adjust an operating range of the characteristic-curve magnet in a section of positive inclination and thus positive rigidity when the turning point of the force-displacement characteristic is in the adjustment range of the first iron core. Subsequently, by way of the second iron core, a required quantitative connection between the cycle ratio and the mixing pressure can be set, wherein this adjustment, as already mentioned, cannot be carried out so that it is decoupled from the first adjustment.

A further generic solenoid plunger system is described in DE 100 46 939. This solenoid plunger system also uses two adjustable iron cores for adjusting a single air gap, wherein additional attenuators are incorporated in the air gap, on the one hand to reduce wear and tear on the solenoid plunger system, and on the other hand in order to increase the scope of application of said solenoid plunger system. In this arrangement, each attenuator safely prevents contact between the metal of the solenoid plunger and the metal of the core, without there being a need for an expensive way of sealing the air gap; in addition each attenuator absorbs the sound, for the purpose of reducing the noise emission of an electropneumatic pressure transducer which uses the solenoid plunger system; and each attenuator is preferably made from an elastomer which has a low temperature dependence and thus increases the scope of application of the electropneumatic pressure transducer.

It is the object of the present invention to improve the generic solenoid plunger system such that the disadvantages of the state of the art are overcome, in particular such that the adjustment options are expanded and simplified. In this arrangement two mutually decoupled adjustment options are to be provided.

According to the invention, this object is met in that the casing comprises a second shell or sleeve of high magnetic permeability between the first shell and the yoke, wherein said second shell comprises at least one recess, in particular in the shape of an annular groove, on its side facing away from the core, for focusing magnetic field lines M from the yoke onto the core, and in that in the region of the recess of said second shell, the yoke and/or adjustment member, in particular in the form of an adjustment ring, of high magnetic permeability is/are moveable relative to said second shell, for adjusting the effective magnetic length L of the recess of the second shell.

In this arrangement it can be provided for the air gap to be arranged in a region between the first shell and the second shell.

Furthermore, it can be provided for a spacer of low magnetic permeability to be arranged between the first shell and the second shell.

Preferred embodiments of the invention are characterized in that the core comprises at least one second recess on the side facing away from the solenoid plunger, and/or the adjustment member comprise(s) at least one first recess on the side facing towards the core, wherein the effective magnetic length L of the recess of the second shell, for targeted focusing of the magnetic field lines M, is adjustable by relative movement between the core and the adjustment member, during which relative movement the core can, at least partly, be moved into/out of the first recess in the adjustment member, and/or the adjustment member can be moved, at least partly, into/out of the second recess in the core.

Furthermore, according to the invention it is preferred that the core comprises at least a third recess, at its end facing away from the solenoid plunger, for the engagement of a tool for adjusting its position, and/or that the adjustment member comprises at least a second recess, on the side facing away from the core, for the engagement of a tool for adjusting its position.

The invention also proposes that the casing comprises a holding device, preferably of high magnetic permeability, for the coil or the magnet, and at least one plain bearing, preferably of high magnetic permeability, wherein preferably the plain bearing for the solenoid plunger is arranged between the solenoid plunger and the first shell.

Furthermore, it can be provided for the core and/or the adjustment member to be moveable relative to the second shell by way of a screw thread.

Embodiments of the invention are characterised by a first attenuator in the first recess of the solenoid plunger, and/or a second attenuator in the first recess of the core, and/or a third attenuator in the second recess of the core, and/or a fourth attenuator in the first recess of the adjustment member, wherein preferably the first, second, third and/or fourth attenuator is/are made from an elastomer.

Finally, according to the invention, it is proposed that the recess in the solenoid plunger, the first and/or second recess of the iron core, and/or the adjustment ring on the side facing towards the iron core is/are bevelled off so as to increase the adjustment range(s).

The invention is thus based on the surprising finding that in a solenoid plunger system the magnetic circuit in two aspects can be adjusted in two decoupled ways. In this arrangement according to the invention, both the necessary setting for determining an adjustment point of an electropneumatic pressure transducer in the region of positive rigidity, and the setting for producing a quantitative connection between a cycle ratio and a mixing pressure can be made possible by decoupled intervention in the magnetic flux of the solenoid plunger system, in that on the one hand an iron core is moved relative to a solenoid plunger for the purpose of adjusting an air gap between them, and on the other hand, separately of the former process, an adjustment ring is moved relative to an annular groove in a shell for adjusting an effective magnetic length of the annular groove, namely as a magnetic impedance.

Figure 2:
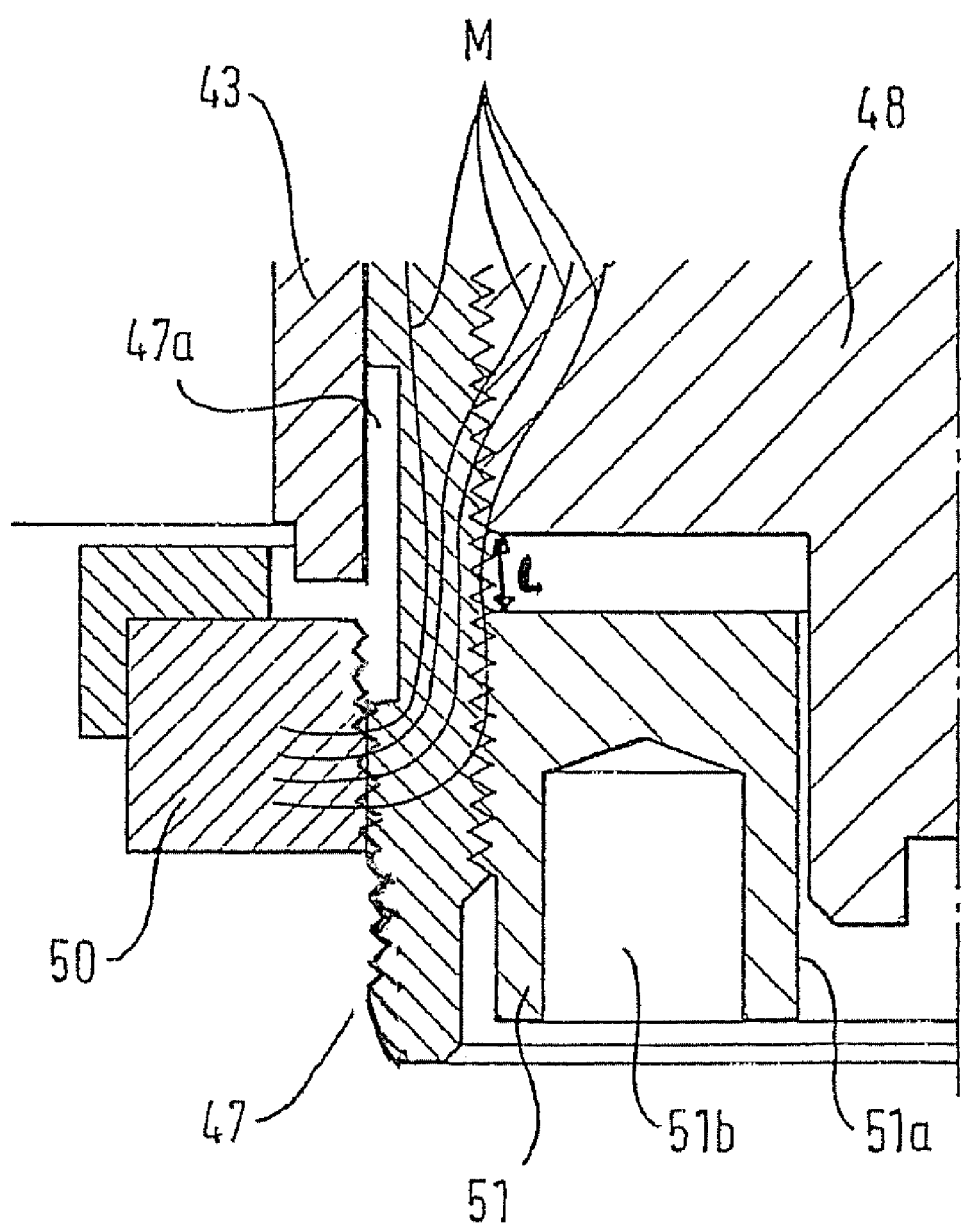

Further characteristics and advantages of the invention are the subject of the following description in which two embodiments of the invention are shown in detail with reference to diagrammatic drawings as follows:

FIG. 1 a sectional view of part of an electropneumatic pressure transducer with a first solenoid plunger system according to the invention;

FIG. 2 an enlarged view of section A of FIG. 1; and

FIG. 3 a sectional view of part of an electropneumatic pressure transducer with a second solenoid plunger system according to the invention.

As shown in FIG. 1, an electropneumatic pressure transducer 1, which for example can be used for a pneumatic control system in a motor vehicle, comprises a valve unit 2, which is operated by a diaphragm 3 and a solenoid plunger system 4 according to the invention. Low-pressure air fed in by way of a first connection 5 can be mixed with atmospheric air fed in by way of a second connection 8, wherein such mixing takes place in a valve chamber 7 by controlling the respective connections 5, 8 in such a way that the mixing pressure which has been generated in the valve chamber 7 can be fed to a consumer by way of a third connection 6. In this arrangement, by way of the first connection 5, the suction pressure can be fed to an internal combustion engine of a motor vehicle, and the third connection 6 can be connected to an exhaust gas recirculation valve of said motor vehicle.

The solenoid plunger system 4 according to the invention comprises a coil 41 which in an intermediate arrangement of a first shell or sleeve 42 between a holding device 43 for the coil 41 and a plain bearing bush 44 encompasses a solenoid plunger 45 which is movable along the plain bearing bush 44. Within the holding device 43, in addition to the first shell 42 and plain bearing bush 44, a spacer 46 and a second shell 47 are arranged. In this arrangement, the second shell 47 at least partly encompasses an iron core 48, which is movable along the second shell 47 by way of a screw thread. In the region of the spacer 46 there is an air gap 49 between the solenoid plunger 45 and the iron core 48. At the end of the holding device 43, which end is facing away from the valve unit 2, a yoke 50 and an adjustment ring 51 are provided, wherein the adjustment ring 51 is stored within the second shell 47 and the yoke 50 so as to be movable along the second shell 47 by way of a screw thread. Furthermore, the first shell 42, the holding device 43, the second shell 47, and the yoke 50 are made from a material of high magnetic permeability; they constitute in particular an iron casing for focusing magnetic field lines. The solenoid plunger 45 comprises a first recess 45a on its side facing towards the iron core 48. The second shell 47 comprises a first recess 47a, preferably in the form of an annular groove, on its side facing towards the yoke 50. The iron core 48 comprises a first recess 48a on its side facing towards the solenoid plunger 45, and a second as well as a third recess on the face facing away from the solenoid plunger 45. The adjustment ring 51 comprises a first recess 51a on the side facing towards the iron core 48, and a second recess 51b on the side facing away from the iron core 48.

The solenoid plunger system 4 whose design has just been described can be adjusted as follows:

i) The air gap 49 in the magnetic circuit of the solenoid plunger system 4 can be reduced in size in that the iron core 48 is rotated in a first direction of rotation by way of a tool (not shown) which engages the third recess 48c, and during rotation is moved towards the solenoid plunger 45. During this action the iron core 48 is partially plunged into the first recess 45a of the solenoid plunger 45, and the solenoid plunger 45 is partially plunged into the first recess 48a of the iron core 48. Rotating the iron core 48 in the second direction of rotation, which runs in opposite direction to the first direction of rotation, analogously ensures an increase in the first air gap 49. By means of the size of the air gap 49, an adjustment point near the turning point of the force-displacement characteristic of the solenoid plunger system 4 can be set with positive rigidity.

ii) In addition, a desired quantitative connection between a cycle ratio and a mixing pressure can be set by way of the adjustment ring 51, in that a tool (not shown) is inserted into the second recess 51b of said adjustment ring 51 so as to rotate the adjustment ring 51 further into, or out of, the iron core 48. In this arrangement, the size of the overlap of the recess 47a in the second shell 47 is adjusted by the adjustment ring 51, which provides a guide of the magnetic field lines M and thus adjustment of the magnetomotive force of the solenoid plunger system 4 according to the invention, as is shown in the enlargement of section A of FIG. 1 in FIG. 2. In other words, an adjustment of the effective magnetic length L of the recess 47a in the second shell 47, i.e., of the magnetic, impedance for adjusting the magnetomotive force of the solenoid plunger system 4, is made possible.

FIG. 3 shows a second embodiment of a solenoid plunger system 4' according to the invention for an electropneumatic pressure transducer 1'. Those components which correspond to the components in the first embodiment are designated by the same reference characters, except that an apostrophe has been added.

As already described in connection with FIG. 1, the electropneumatic pressure transducer 1' comprises a valve unit 2', a membrane 3', three connections 5', 6' and 8', as well as a valve chamber 7'. The solenoid plunger system 4' of interest in this context again comprises a coil 41', held by a holding device 43', which coil 41' in turn is arranged around an iron casing which in addition to the holding device 43' comprises a first shell or sleeve 42', a second shell or sleeve 47', and a yoke 50'. The first shell 42' in an intermediate arrangement of a plain bearing bush 44' is arranged around at least part of a solenoid plunger 45'. Between the first shell 42' and the second shell 47', a spacer 46' from a material of low magnetic permeability is arranged. The second shell 47' encompasses an iron core 48' as well as an adjustment ring 51', at least in sections.

The solenoid plunger 45', the iron core 48' as well as the adjustment ring 51' of FIG. 3 differ from the solenoid plunger 45, the iron core 48 and the adjustment ring 51 of FIGS. 1 and 2 in that the respective recesses 45'a, 48'a and 48'b, and 45a, 48a and 48b, respectively, are of a different design. However, plunging of the solenoid plunger 45' in the iron core 48' is still possible. However, it has been shown to be particularly advantageous to bevel the second recess 48'b of the iron core 48' and also to bevel the side of the adjustment ring 51', which side faces towards the iron core 48', which leads to an increase in the adjustment region for the effective magnetic length of the recess 47'a of the second shell 47'.

The function of the solenoid plunger system 4' corresponds to that of the solenoid plunger system 4 with decoupled adjustability, namely coarse adjustment by way of setting the air gap 49' and fine adjustment by way of setting the effective magnetic length of the recess 47'a of the second shell 47' as a magnetic impedance.

Thus, the solenoid plunger system according to the invention for the first time makes it possible to carry out two adjustments which are decoupled from each other, while at the same time achieving a simple design and easy operability for precise adjustment of the magnetic circuit in the solenoid plunger system of a regulated electropneumatic pressure transducer.

The features of the invention, as they are described in the above description, in the claims and in the drawings, can be significant in the context of the invention both individually and in any desired combination in their various embodiments.

LIST OF REFERENCE CHARACTERS

1, 1' Electropneumatic pressure transducer
2, 2' Valve unit
3, 3' Diaphragm
4, 4' Solenoid plunger system
5, 5° Connection
6, 6° Connection
7, 7' Valve chamber
8, 8° Connection
41, 41' Coil
42, 42' Shell or sleeve
43, 43' Holding device
44, 44' Plain bearing bush
45, 45' Solenoid plunger
45a, 45'a Recess
46, 46' Spacer
47, 47' Shell or sleeve
47a, 47'a Recess
48, 48' Iron core
48a, 48'a Recess
48b, 48'b Recess
48c, 48'c Recess
49, 49' Air gap
50, 50' Yoke
51, 51' Adjustment ring
51a, 51'a Recess
51b, 51'b Recess
A Partial view
M Magnetic field line
L Effective magnetic length of the annular groove

What is claimed is:

1. A solenoid plunger system for an electropneumatic pressure transducer, comprising at least partly a solenoid plunger and a core in a casing which focuses magnetic field lines M,
wherein the solenoid plunger includes at least a first recess on a side facing toward the core and/or the core includes at least a first recess on a side facing toward the solenoid plunger,
wherein an air gap is provided between the solenoid plunger and the core, the air gap being adjustable by relative movement between the solenoid plunger and the core, during which relative movement the solenoid plunger can, at least partly, be moved into or out of the first recess in the core and/or the core can be moved, at least partly, into or out of the first recess in the solenoid plunger;
wherein the casing includes at least a first shell and a yoke, each of high magnetic permeability, wherein the first shell is arranged between the solenoid plunger and at least one coil and/or at least one magnet, and the air gap is arranged in a region between the first shell and the yoke; and
wherein the casing includes a second shell of high magnetic permeability between the first shell and the yoke, said second shell comprising at least one recess on its side facing away from the core for focusing magnetic field lines M from the yoke onto the core, and in the region of the recess of said second shell, the yoke, the core and/or an adjustment member of high magnetic permeability is/are moveable relative to said second shell for adjusting the effective magnetic length L of the recess of the second shell.

2. The solenoid plunger system according to claim 1, wherein the casing is in the form of an iron casing.

3. The solenoid plunger system according to claim 1, wherein the core is in the form of an iron or magnetic core.

4. The solenoid plunger system according to claim 1, wherein the recess of the second shell is in the shape of an annular groove.

5. The solenoid plunger system according to claim 1, wherein the adjustment member is in the form of an adjustment ring.

6. The solenoid plunger system according to claim 1, wherein the air gap is arranged in a region between the first shell and the second shell.

7. The solenoid plunger system according to claim 6, further comprising a spacer of low magnetic permeability that is arranged between the first shell and the second shell.

8. The solenoid plunger system according to claim 1, further comprising a spacer of low magnetic permeability that is arranged between the first shell and the second shell.

9. The solenoid plunger system according to claim 1, wherein the core further comprises at least a second recess on a side facing away from the solenoid plunger and/or the adjustment member further comprises at least a first recess on a side facing toward the core; and wherein the effective magnetic length L of the recess of the second shell, for targeted focusing of the magnetic field lines M, is adjustable by relative movement between the core and the adjustment member, during which relative movement the core can, at least partly, be moved into or out of the first recess in the adjustment member, and/or the adjustment member can be moved, at least partly, into or out of the second recess in the core.

10. The solenoid plunger system according to claim 9, further comprising a first attenuator in the first recess of the solenoid plunger, and/or a second attenuator in the first recess of the core, and/or a third attenuator in the second recess of the core, and/or a fourth attenuator in the first recess of the adjustment member, wherein the first, second, third and/or fourth attenuator are/is made from an elastomer.

11. The solenoid plunger system according to claim 1, wherein the core includes at least a third recess at an end facing away from the solenoid plunger for the engagement of a tool for adjusting its position.

12. The solenoid plunger system according to claim 1, wherein the adjustment member includes at least a second recess on a side facing away from the core for the engagement of a tool for adjusting its position.

13. The solenoid plunger system according to claim 1, wherein the casing further comprises a holding device for the coil or the magnet.

14. The solenoid plunger system according to claim 13, wherein the holding device has a high magnetic permeability.

15. The solenoid plunger system according to claim 13, wherein the casing further comprises at least one plain bearing for the solenoid plunger arranged.

16. The solenoid plunger system according to claim 15, wherein the plain bearing has a high magnetic permeability. between the solenoid plunger and the first shell.

17. The solenoid plunger system according to claim 1, wherein the core is moveable relative to the second shell by way of a screw thread.

18. The solenoid plunger system according to claim 1, wherein the adjustment member is moveable relative to the second shell by way of a screw thread.

19. The solenoid plunger system according to claim 1, wherein the first recess in the solenoid plunger on the side facing towards the core is beveled off so as to increase the adjustment range.

20. The solenoid plunger system according to claim 1, wherein the first and/or second recess of the core is beveled off so as to increase the adjustment range.

21. The solenoid plunger system according to claim 1, wherein the adjustment ring on the side facing toward the iron core is beveled off so as to increase the adjustment range.

* * * * *

UNITED STATES PATENT AND TRADEMARK OFFICE
CERTIFICATE OF CORRECTION

PATENT NO. : 7,205,685 B2
APPLICATION NO. : 10/535040
DATED : April 17, 2007
INVENTOR(S) : U. Reichert et al.

It is certified that error appears in the above-identified patent and that said Letters Patent is hereby corrected as shown below:

| COLUMN | LINE | ERROR |
|---|---|---|
| 8 (Claim 15, | 20 line 3) | "plunger arranged." should read --plunger arranged between the solenoid plunger and the first shell.-- |
| 8 (Claim 16, | 23 line 6) | delete "between the solenoid plunger and the first shell."-- |

Signed and Sealed this

Seventh Day of August, 2007

JON W. DUDAS
*Director of the United States Patent and Trademark Office*